(12) United States Patent
Merriam (10) Patent No.: US 9,299,052 B2
(45) Date of Patent: Mar. 29, 2016

(54) DEVICE MOVEMENT DETECTION WHEN POWERED DOWN

(71) Applicant: XEROX Corporation, Norwalk, CT (US)

(72) Inventor: Ray Uri Merriam, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 70 days.

(21) Appl. No.: 14/155,710

(22) Filed: Jan. 15, 2014

(65) Prior Publication Data
US 2015/0199597 A1 Jul. 16, 2015

(51) Int. Cl.
*G06F 15/00* (2006.01)
*G06Q 10/08* (2012.01)

(52) U.S. Cl.
CPC ...................................... *G06Q 10/08* (2013.01)

(58) Field of Classification Search
None
See application file for complete search history.

(56) References Cited

U.S. PATENT DOCUMENTS

| | | | |
|---|---|---|---|
| 6,989,748 B2 | 1/2006 | Rabanne et al. | |
| 8,131,465 B2 | 3/2012 | Eitan et al. | |
| 2007/0175341 A1* | 8/2007 | Roberts | 100/102 |
| 2008/0233550 A1* | 9/2008 | Solomon | 434/276 |
| 2012/0138677 A1* | 6/2012 | Ma et al. | 235/379 |
| 2013/0002481 A1 | 1/2013 | Solomon | |
| 2013/0063304 A1 | 3/2013 | O'Regan et al. | |
| 2013/0249673 A1 | 9/2013 | Ferrari | |
| 2013/0297690 A1* | 11/2013 | Lucero et al. | 709/204 |

FOREIGN PATENT DOCUMENTS

| | | |
|---|---|---|
| EP | 0 097 742 | 1/1984 |
| WO | 200137236 | 5/2001 |
| WO | 2007049011 | 5/2007 |
| WO | 2013065042 | 5/2013 |

* cited by examiner

*Primary Examiner* — Helen Q Zong
(74) *Attorney, Agent, or Firm* — Gibb & Riley, LLC (57) ABSTRACT

Systems and methods detect a power supply device of an apparatus being disconnected from an external AC power source and control a DC power storage element of the apparatus to supply power to a processor and directional force sensor of the apparatus. Such systems and methods record directional force measurements output by the directional force sensor and a measure of time output by a clock device of the apparatus while the processor detects that the power supply is disconnected from the external AC power source to store directions, magnitudes, and time durations of the directional force measurements in a non-transitory computer-readable storage medium of the apparatus. These systems and methods calculate and output a path of movement of the apparatus that occurred while the apparatus was disconnected from the external AC power source based on the directions, magnitudes, and time durations of the directional force measurements using the processor.

20 Claims, 5 Drawing Sheets

DEVICE MOVEMENT DETECTION WHEN POWERED DOWN

BACKGROUND

Systems and methods herein generally relate to detecting when devices that are primarily stationary (perform their primary operational function only while connected to an external AC power source) are moved, and when they are moved calculating the path of such movement, without using external devices, such as GPS or other wireless positioning devices.

Technical support systems for fleets of printing devices are challenged when the customer moves such printing devices without notifying the support company that the primarily stationary device was moved. When the support technician attempts to service a device, but cannot find the primarily stationary device because it has been moved, the support company incurs a large cost while the technician tries to locate the device. Some devices use a global positioning system (GPS) or other wireless positioning system (such as sensing internet protocol (IP) subnets from wireless routers, etc.) to determine the geographic position of managed devices; however, such an approach can be both cost prohibitive and unreliable. GPS systems have inherent weaknesses with limited access when indoors and the inability, with most low cost devices, to reliably detect location.

SUMMARY

An exemplary method herein detects a power supply device of an apparatus being disconnected from an external alternating current (AC) power source (using a processor of the apparatus) and controls a direct current (DC) power storage element of the apparatus, using the processor, to supply power to the processor and to a directional force sensor of the apparatus (based on the processor detecting the power supply being disconnected from the external AC power source). This exemplary method records directional force measurements output by the directional force sensor and a measure of time output by a clock device of the apparatus while the processor detects that the power supply is disconnected from the external AC power source to store directions, magnitudes, and time durations of the directional force measurements in a non-transitory computer-readable storage medium of the apparatus. This exemplary method calculates and outputs a path of movement of the apparatus that occurred while the apparatus was disconnected from the external AC power source based on the directions, magnitudes, and time durations of the directional force measurements using the processor.

An exemplary printing apparatus herein comprises a processor, and a non-transitory computer-readable storage medium operatively connected to the processor. The non-transitory computer-readable storage medium stores a recorded geographic location of the printing apparatus. A clock device is operatively connected to the processor, and the clock device outputs a measure of time. A printing engine and a directional force sensor are also operatively connected to the processor. The directional force sensor outputs directional force measurements having direction and magnitude. Further, a direct current (DC) power storage element is operatively connected to the processor and the directional force sensor, and a power supply device is operatively connected to an external alternating current (AC) power source, the processor, the printing engine, and the DC power storage element.

The processor detects when the power supply device is disconnected from the external AC power source. The processor controls the DC power storage element to supply power to the processor and to the directional force sensor based on the processor detecting the power supply being disconnected from the external AC power source. The processor also records the directional force measurements and the measure of time while the processor detects that the power supply is disconnected from the external AC power source to store directions, magnitudes, and time durations of the directional force measurements in the non-transitory computer-readable storage medium. The processor then calculates a path of movement of the printing apparatus that occurred while the printing apparatus was disconnected from the external AC power source based on the directions, magnitudes, and time durations of the directional force measurements. The path of movement calculated has a beginning point and an ending point. The processor thus calculates and outputs a revised geographic location of the printing apparatus by locating the beginning point of the path of movement at the recorded geographic location and calculates the revised geographic location as the ending point of the path of movement.

An exemplary system herein comprises a computerized device and a printing apparatus operatively connected to the computerized device. The computerized device comprises a first processor and a first non-transitory computer-readable storage medium that is operatively connected to the first processor. The first non-transitory computer-readable storage medium stores a recorded geographic location of the printing apparatus.

Similar to that described above, the printing apparatus of this exemplary system comprises: a second processor; a second non-transitory computer-readable storage medium operatively connected to the second processor; a clock device operatively connected to the second processor (again, the clock device outputs a measure of time); a printing engine operatively connected to the second processor; a directional force sensor operatively connected to the second processor (again, the directional force sensor outputs directional force measurements having direction and magnitude); a DC power storage element operatively connected to the second processor and the directional force sensor; and a power supply device operatively connected to the external AC power source, the second processor, the printing engine, and the DC power storage element. The printing apparatus is primarily a stationary (non-portable) item and only performs its primary operational function (printing) while connected to the external AC power source. Therefore, the printing engine operates only when the power supply is connected to the external AC power source.

The second processor detects the power supply device being disconnected from the external AC power source. The second processor controls the DC power storage element to supply power to the processor and to the directional force sensor based on the processor detecting the power supply being disconnected from the external AC power source. In some methods, devices, and systems herein, the second processor activates the directional force sensor only while the processor detects that the power supply is disconnected from the external AC power source.

The second processor also records the directional force measurements and the measure of time while the processor detects that the power supply is disconnected from the external AC power source to store directions, magnitudes, and time durations of the directional force measurements in the second non-transitory computer-readable storage medium.

The second processor also detects the power supply device being connected (or reconnected) to the external AC power source. The second processor then outputs the directional force measurements and the measure of time to the first processor based on the second processor detecting the power supply device being connected (or reconnected) to the external AC power source.

The first processor calculates a path of movement of the printing apparatus that occurred while the printing apparatus was disconnected from the external AC power source based on the directions, magnitudes, and time durations (of accelerations and decelerations) detected by the directional force measurements. Again, this path of movement has a beginning point and an ending point. The first processor calculates the path of movement based on patterns of directions, magnitudes, and time durations the directional force sensor.

The first processor calculates and outputs a revised geographic location of the printing apparatus by locating the beginning point of the path of movement at the recorded geographic location and calculates the revised geographic location as the ending point of the path of movement.

In some methods, devices, and systems herein the printing apparatus can be mounted on one or more wheels, one or more of which can comprise a rotational sensor that outputs a distance measurement. If so equipped, the first processor can calculate the path of movement based in part on the distance measurement.

These and other features are described in, or are apparent from, the following detailed description.

BRIEF DESCRIPTION OF THE DRAWINGS

Various exemplary systems and methods are described in detail below, with reference to the attached drawing figures, in which.

DETAILED DESCRIPTION

As mentioned above, service issues arise when a device is moved from a recorded location, without the location being updated in the management application. Using a GPS attachment on such devices can be too costly, and may not effectively provide a location within buildings. Therefore, the methods, devices, and systems herein use an inexpensive three-dimensional (3D) accelerometer (motion sensing device) with a timer to estimate direction and distance moved. Basic motion sensing devices are substantially less expensive, and consume substantially less power, than GPS or other wireless systems. The capabilities of the motion sensing device can sense each direction, the amount of force applied, and the estimated distance traversed. The methods, devices, and systems herein are sensitive enough to determine (through, for example, the management application) if the primarily stationary device was moved across the room, down the hall, down an elevator, or clear across town. Additionally, such motion sensing devices can inform the support system if the primarily stationary device was dropped in transit (suffered a force that exceeds predetermined thresholds).

While printing devices are used in the examples herein, the methods, devices, and systems herein work with all devices that are primarily stationary and perform their primary operational function only while connected to an external AC power source. This includes, but is not limited to, multifunction devices (MFD), scanners, printers, finishing equipment, media handling equipment, desktop computers, sound systems, televisions, food processing and storage equipment, manufacturing machines, medical equipment (X-ray devices, CAT scanners, MIR machines, etc.), etc. Such primarily stationary devices are contrasted with devices that are primarily mobile (cell phones, laptop computers, tablet computers, package tracking devices, etc.) even though the primarily mobile devices may perform their primary function also while plugged into AC power sources. The distinction of the primarily stationary devices is that primarily stationary devices cannot perform their primary operating function (e.g., printing, scanning, x-raying, amplifying, displaying, refrigerating, etc.) unless they are plugged into an AC power source with a corded electrical plug.

For example, a portable hand-held scanning device would not be a primarily stationary device because it can perform its primary operating function (scanning) while unplugged from an AC power source. To the contrary, a desktop scanning device would be a primarily stationary device because it can perform its primary operating function (scanning) only while plugged into an AC power source. Therefore, it is not the function that the primarily stationary device performs that makes it a primarily stationary or primarily mobile device, but instead its reliance upon a corded connection to an AC power source that makes a device primarily stationary.

These primarily stationary devices are typically not battery operated because they do not perform their primary operational function under battery power. Without powering off the primarily stationary device, a person would only be able to move the primarily stationary device as far as the length of the power cord. In order to move such primarily stationary device a greater distance than the length of the power cord, the primarily stationary device would have to be disconnected from the AC power source. The methods, devices, and systems herein take advantage of this unique characteristic to record motion that occurs only when the primarily stationary device is unplugged and use battery to power the motion sensor, processor, electronic memory device, etc.

The methods, devices, and systems herein can take many forms. They can be built into the primarily stationary device and have its data included in the primarily stationary device's shared data, they can be built into a separate device that can be plugged into device (for example, using a USB port and the primarily stationary device can be programmed to share the sensor's data along with its own data, etc.), they can take the form of a standalone device that is connected to the primarily stationary device to be monitored (and is then plugged into a network port and power to allow the standalone device to communicate its data independently up to the management application, where it is associated with the primarily stationary device). The external device could obtain its power via a USB port if one is available on the primarily stationary device being monitored.

In managed print services (MPS) the methods, devices, and systems herein use a device management application installed within the customer's environments to monitor devices. For printers, this device management application can, for example, use the simple network management protocol (SNMP) to retrieve relevant information from the primarily stationary device. This and other networking protocols are used to retrieve the motion sensor's data. In MPS, this data is communicated to the central management application for further processing. An alternative to the primarily stationary device management application uses the motion sensor device to communicate directly to the central management application.

The methods, devices, and systems herein only evaluate movement when the primarily stationary device being monitored is turned off and disconnected from an AC power source, thereby saving resources and electricity by only using the motion sensors when there is a possibility that the primarily stationary device is being moved beyond the length of the power cord. The level of sensitivity of the motion sensors allows all movement to be detected and stored, or only movement that exceeds a predetermined force level (e.g., is greater than X Newton's (or some other measurement)) may be recorded. When the primarily stationary device is reconnected to the AC power source and powered back up, all of the motion sensor data is then communicated up to the management application for evaluation. Alternatively, when the sensor is both powered up and connected, it too may individually communicate with the management application, if the sensor is a standalone device.

Examples of the data that is communicated via the motion sensor includes, but is not limited to: power disconnection and connection times; sensor capabilities (level or type); detection of motion; the time of the motion (coordinated with a clock signal); the direction of the motion (e.g., up/down/left/right/front/back; or if the sensor device includes a compass, North, South, East, West, etc.); the magnitude of the force of the movement; the duration of the movement (combining force and duration can be used to estimate distance); etc.

The management application can evaluate the detected motion and in accordance with preset rules that are dynamic and relevant to the abilities of the sensor. For example, the rules can require that only movement that occurred while the primarily stationary device is disconnected from the AC power source is utilized, only movement that exceeds a predetermined force level is utilized, movement is only recorded when the cumulative duration of the movement is longer than some predetermined time period (e.g., 60 seconds, etc.). If the evaluation of the sensor data according to such rules results in a positive alert decision, the management application then notifies the respective person or persons linked to the primarily stationary device so that appropriate actions are performed.

In addition, the methods, devices, and systems herein are integrated with existing geographic maps, or maps of the interior of structures and buildings. Many of MPS accounts maintain a map of the customer location with the stored location (starting point) of the primarily stationary device. The methods, devices, and systems herein utilize the recorded time, direction, force, and duration for each of the individual movements that occurred to provide a step by step listing of each movement of the primarily stationary device to create a recorded movement path. Given the starting point and a calculated path, the ending location of the moved device can be estimated to project where to look for the primarily stationary device.

Therefore, the systems and methods herein use a motion sensing device (that can be included in or attached to a primarily stationary device to be monitored). The motion sensor records all movement applied to the primarily stationary device, and this motion data is communicated to a management application where it is evaluated. If the motion exceeds a predetermined threshold (in distance or force magnitude) this triggers an alert that the primarily stationary device has been moved, allowing someone to validate the primarily stationary device's new location.

Figure 1:
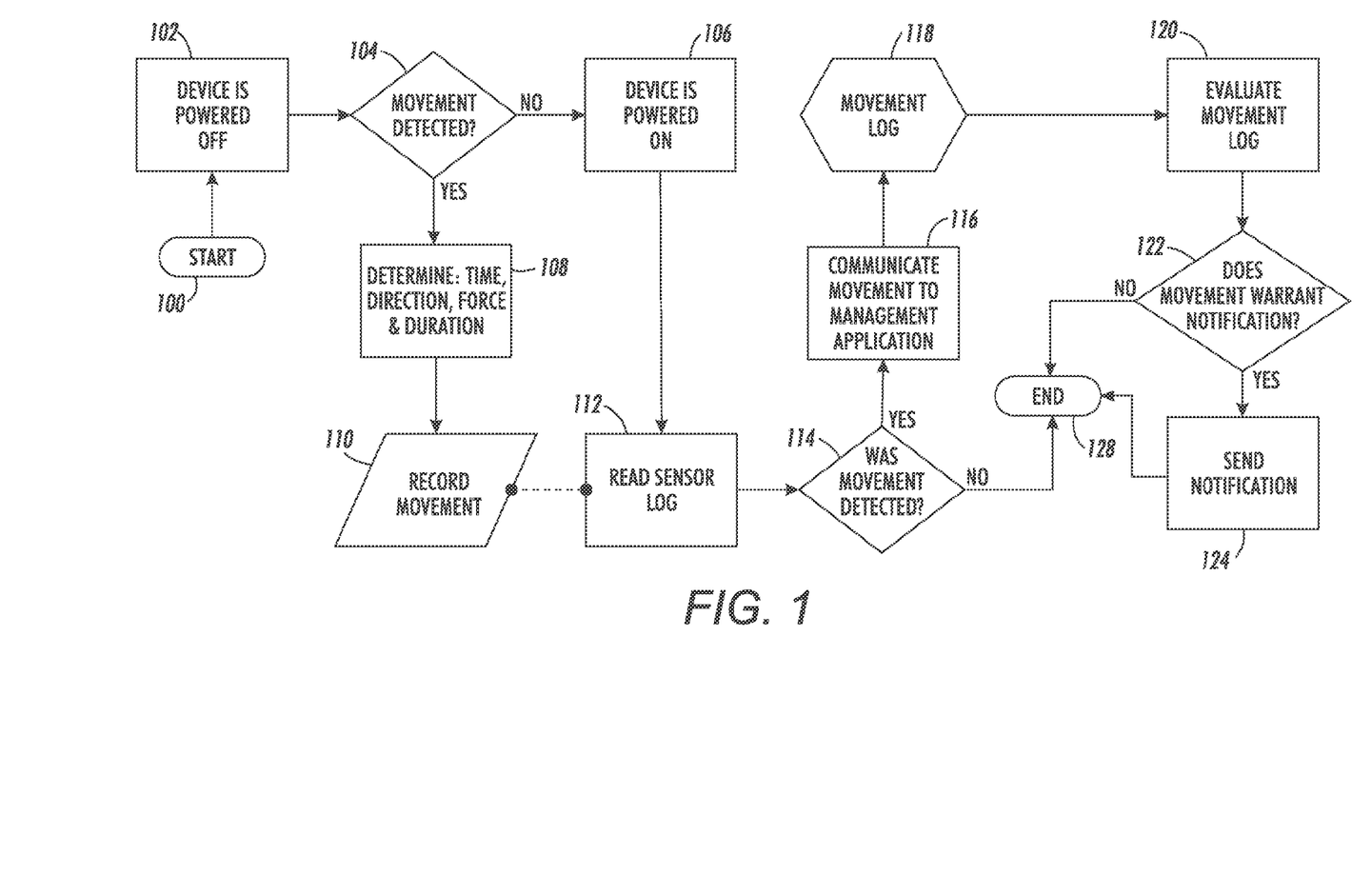
FIG. 1 is a flow diagram of various methods herein.

FIG. 1 is a flowchart illustrating one example of the processing performed by the methods, devices, and systems herein. This flowchart starts in item 100. Item 102 represents the powering off of the primarily stationary device by disconnecting its electrical plug cord from an AC power source. As noted above, once disconnected from the AC power source, the primarily stationary device will not be able to perform its primary operational function and, therefore, in the examples herein, the primarily stationary device would not be able to perform any printing or any other function the device may be capable of performing. Instead, after item 102, the primarily stationary device is fully off, and the only items that are functioning relate to detecting and tracking the primarily stationary devices motion.

Item 104 determines whether movement is detected. If no movement is detected before the primarily stationary device is reconnected to the AC power source, processing proceeds to item 106 where the primarily stationary device is powered on. Alternatively, if movement is detected, in item 108, the time, direction, force, duration, etc., of such movement is determined. In item 110, such movement record data is recorded.

Processing then proceeds from items 106 and 110 to item 112 where the system reads the sensor log. Item 114 decides whether or not the sensor log demonstrates that moving was detected. If movement was not detected, no action needs to be taken by the management system and processing ends in item 128.

However, if movement that may exceed time, distance, or force magnitude limits is detected in item 114, processing proceeds to item 116 where the movement is communicated to the management application. In item 118, the management application is provided the movement log and, in item 120, the management application evaluates the movement log. In item 122, the management application determines whether the movement warrants notification (e.g., again, potentially depending upon time, distance, or force magnitude limits). If not, processing ends at item 128. If the movement does warrant notification, the notification is sent in item 124.

Figure 2:
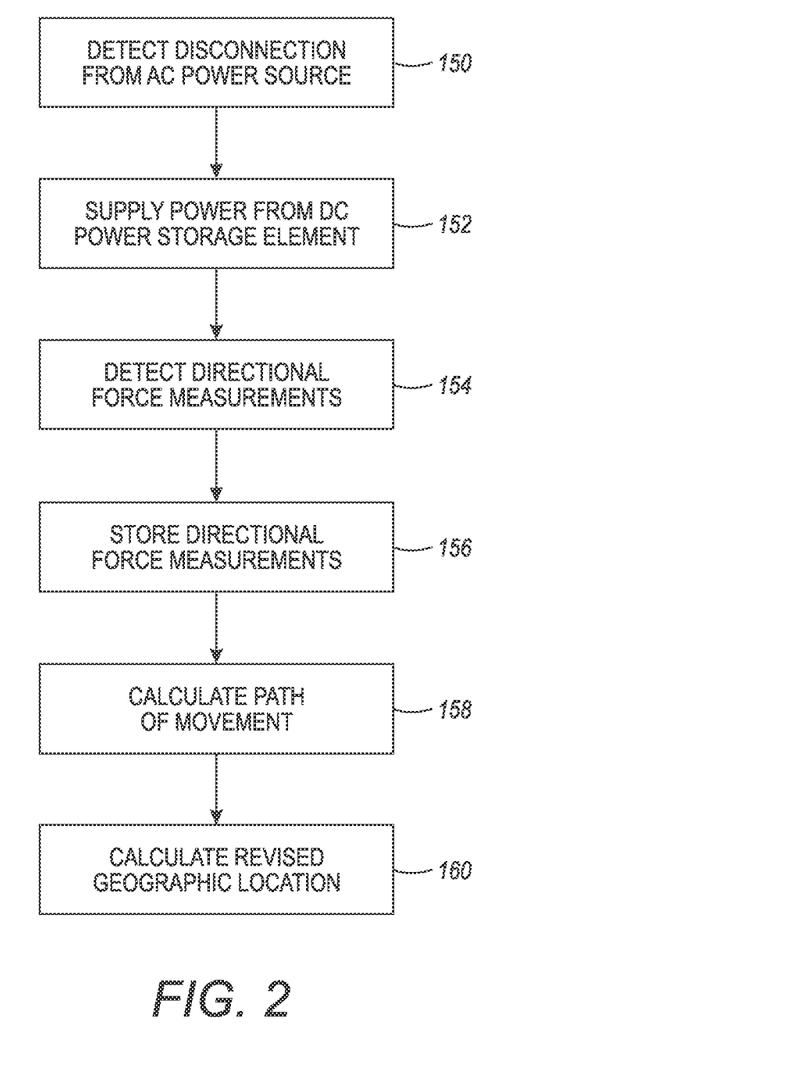
FIG. 2 is a flow diagram of various methods herein.

FIG. 2 is flowchart more generically illustrating exemplary methods herein. In item 150, these methods detect a power supply device of an apparatus being disconnected from an external alternating current (AC) power source (using a processor of the apparatus). As noted above, the apparatus is either a primarily stationary apparatus (e.g., printer, scanner, x-ray machine, etc.) that is capable of performing its primary operating function only while connected to the AC power source, or is connected to such a primarily stationary apparatus (e.g., battery powered, USB motion tracker plugged into the printer, scanner, x-ray machine, etc.).

In item 152, these methods control a direct current (DC) power storage element of the apparatus, using the processor, to supply power to the processor and to a directional force sensor of the apparatus (based on the processor detecting the power supply being disconnected from the external AC power source).

In item 154, these exemplary methods detect directional force measurements output by the directional force sensor and a measure of time output by a clock device of the apparatus while the processor detects that the power supply is disconnected from the external AC power source. Thus, in item 156, these methods store directions, magnitudes, and time durations of the directional force measurements in a non-transitory computer-readable storage medium of the apparatus.

In item 158, this exemplary method then calculates and outputs a path of movement of the apparatus that occurred while the apparatus was disconnected from the external AC power source (again, based on the directions, magnitudes, and time durations of the directional force measurements using the processor). In item 160, such methods calculate and output a revised geographic location of the apparatus by locating the beginning point of the path of movement at the previously recorded geographic location (the last known physical location of the apparatus) and calculating the revised geographic location as the ending point of the path of movement.

Figure 3:
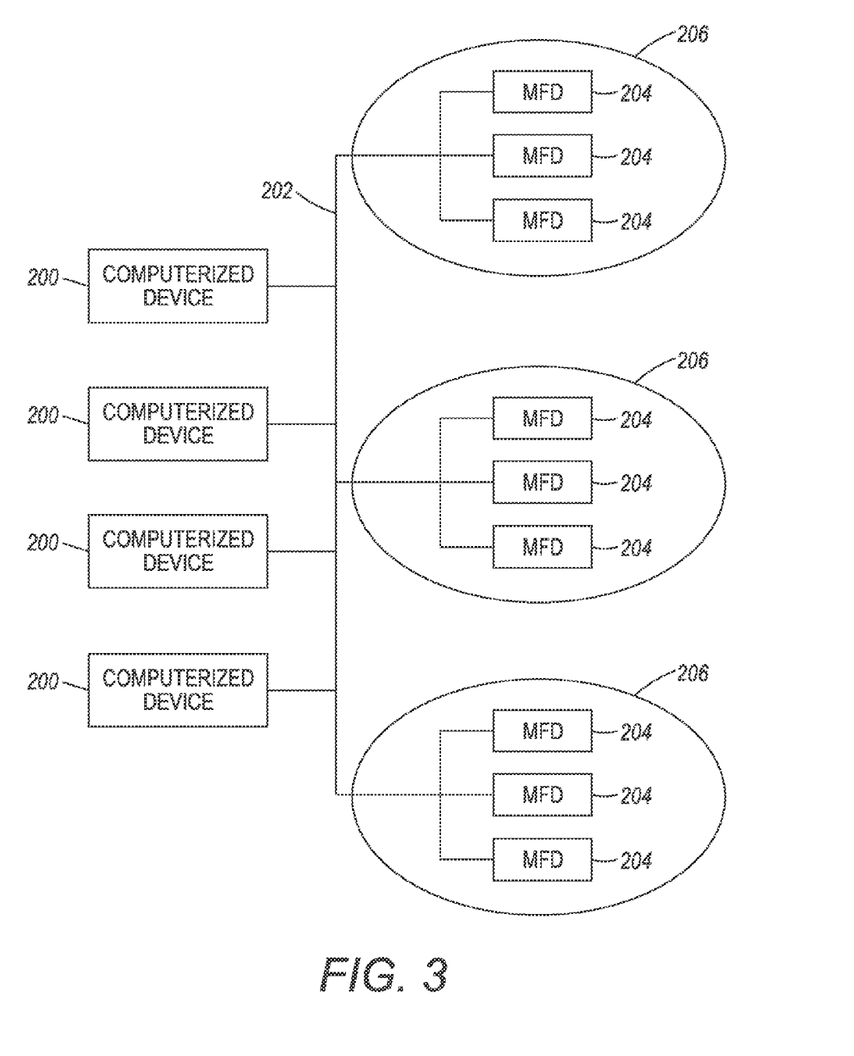
FIG. 3 is a schematic diagram illustrating systems herein.

As shown in FIG. 3, exemplary system systems and methods herein include various computerized devices 200, 204 located at various different physical locations 206. The computerized devices 200, 204 can include print servers, printing devices, personal computers, etc., and are in communication (operatively connected to one another) by way of a local or wide area (wired or wireless) network 202.

Figure 4:
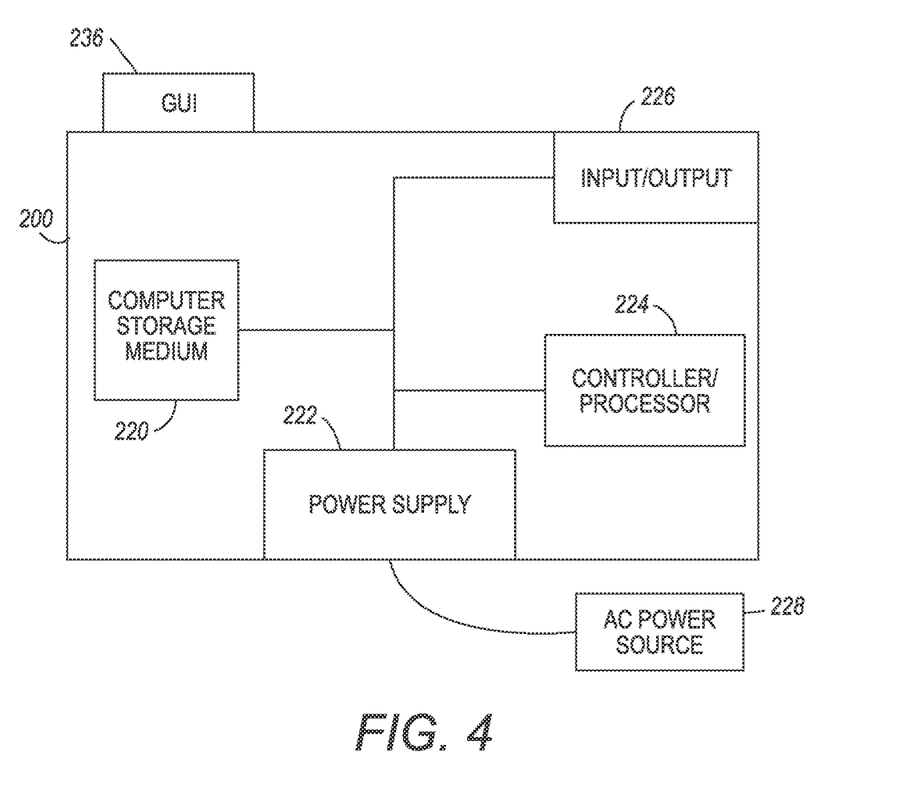
FIG. 4 is a schematic diagram illustrating devices herein.

FIG. 4 illustrates a computerized device 200, which can be used with systems and methods herein and can comprise, for example, a print server, a personal computer, a portable computing device, etc. The computerized device 200 includes a controller/processor 224 and a communications port (input/output) 226 operatively connected to the processor 224 and to the computerized network 202 external to the computerized device 200. Also, the computerized device 200 can include at least one accessory functional component, such as a graphic user interface assembly 236 that also operate on the power supplied from the external power source 228 (through the power supply 222).

The input/output device 226 is used for communications to and from the computerized device 200. The processor 224 controls the various actions of the computerized device. A non-transitory computer storage medium device 220 (which can be optical, magnetic, capacitor based, etc.) is readable by the processor 224 and stores instructions that the processor 224 executes to allow the computerized device to perform its various functions, such as those described herein. Thus, as shown in FIG. 4, a body housing has one or more functional components that operate on power supplied from an alternating current (AC) source 228 by the power supply 222. The power supply 222 can comprise a power storage element (e.g., a battery, capacitors, etc).

Figure 5:
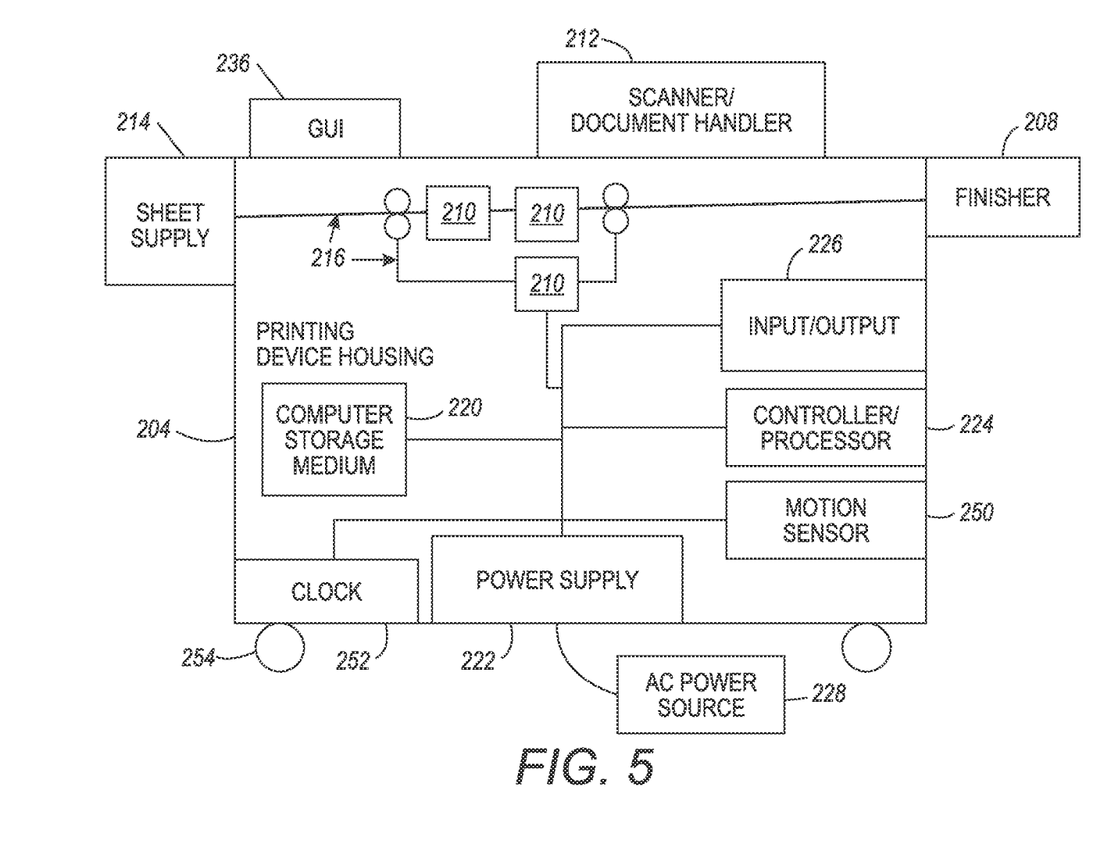
FIG. 5 is a schematic diagram illustrating devices herein.

FIG. 5 illustrates a computerized device that is a printing device 204, which can be used with systems and methods herein and can comprise, for example, a printer, copier, multi-function machine, multi-function device (MFD), etc. The printing device 204 includes many of the components mentioned above and at least one marking device (printing engines) 210 operatively connected to the processor 224, a media path 216 positioned to supply sheets of media from a sheet supply 214 to the marking device(s) 210, a clock 252, motion sensors 250, etc. After receiving various markings from the printing engine(s), the sheets of media can optionally pass to a finisher 208 which can fold, staple, sort, etc., the various printed sheets. Also, the printing device 204 can include at least one accessory functional component (such as a scanner/document handler 212, etc.) that also operates on the power supplied from the external power source 228 (through the power supply 222).

Thus, as shown above, an exemplary printing apparatus 204 herein comprises a processor 224, and a non-transitory computer-readable storage medium 220 is operatively connected to the processor 224. The non-transitory computer-readable storage medium 220 stores a recorded geographic location of the printing apparatus 204. A clock device 252 is operatively connected to the processor 224, and the clock device 252 outputs a measure of time. A printing engine 210 and a directional force sensor 250 are also operatively connected to the processor 224. The directional force sensor 250 outputs directional force measurements having direction and magnitude and can be a permanent component of the printing apparatus 204, or can be temporarily attached to the printing apparatus 204 (e.g., through USB connection, through screw, bolt, or tape connection, etc.) and may be independently battery powered. Further, a direct current (DC) power storage element 222 is operatively connected to the processor 224 and the directional force sensor 250, and a power supply device is operatively connected to an external alternating current (AC) power source 228, the processor 224, the printing engine 210, and the DC power storage element 222.

The processor 224 detects when the power supply device is disconnected from the external AC power source 228. The processor 224 controls the DC power storage element 222 to supply power to the processor 224 and to the directional force sensor 250 based on the processor 224 detecting the power supply being disconnected from the external AC power source 228. The also processor 224 records the directional force measurements and the measure of time while the processor 224 detects that the power supply is disconnected from the external AC power source 228 to store directions, magnitudes, and time durations of the directional force measurements in the non-transitory computer-readable storage medium 220. The processor 224 then calculates a path of movement of the printing apparatus 204 that occurred while the printing apparatus 204 was disconnected from the external AC power source 228 based on the directions, magnitudes, and time durations of the directional force measurements. The path of movement calculated has a beginning point and an ending point. The processor 224 thus calculates and outputs: a notification that the printing apparatus 204 has experienced movement that exceeds time, distance, or force magnitude limits; the calculated path; and potentially a revised geographic location (or estimate) of the printing apparatus 204 by locating the beginning point of the path of movement at the recorded geographic location and calculating the revised geographic location as the ending point of the path of movement.

An exemplary system herein comprises the computerized device 200 and the printing apparatus 204 operatively connected to the computerized device 200. The computerized device 200 comprises a first processor 224 and a first non-transitory computer-readable storage medium 220 that is operatively connected to the first processor 224 of the computerized device 200. The first non-transitory computer-readable storage medium 220 of the computerized device 200 stores a recorded geographic location of the printing apparatus 204.

Similar to that described above, the printing apparatus 204 of this exemplary system comprises: a second processor 224; a second non-transitory computer-readable storage medium 220 operatively connected to the second processor 224 of the printing device 204; a clock device 252 operatively connected to the second processor 224 of the printing device 204 (again, the clock device 252 outputs a measure of time); a printing engine 210 operatively connected to the second processor 224 of the printing device 204; a directional force sensor 250 operatively connected to the second processor 224 of the printing device 204 (again, the directional force sensor 250 outputs directional force measurements having direction and magnitude); a DC power storage element 222 operatively connected to the second processor 224 of the printing device 204 and the directional force sensor 250; and a power supply device operatively connected to the external AC power source 228, the second processor 224 of the printing device 204, the printing engine 210, and the DC power storage element 222.

As noted above, the printing apparatus 204 is used as an example to represent all devices that are primarily a stationary (non-portable) item and that only performs their primary operational function (e.g., printing in this illustrative example) while connected to the external AC power source 228. Therefore, the printing engine 210 operates only when the power supply is connected to the external AC power source 228 (and does not operate when connected to the battery in the power supply 222 alone).

The second processor 224 of the printing device 204 detects the power supply device being disconnected from the external AC power source 228. The second processor 224 of the printing device 204 controls the DC power storage element 222 to supply power to the processor 224 and to the directional force sensor 250 based on the processor 224 detecting the power supply being disconnected from the external AC power source 228. In some methods, devices, and systems herein, the second processor 224 of the printing device 204 activates the directional force sensor 250 only while the processor 224 detects that the power supply is disconnected from the external AC power source 228.

The second processor 224 of the printing device 204 also records the directional force measurements and the measure of time while the processor 224 detects that the power supply is disconnected from the external AC power source 228 to store directions, magnitudes, and time durations of the directional force measurements in the second non-transitory computer-readable storage medium 220 of the printing device 204.

The second processor 224 of the printing device 204 also detects the power supply device being connected (or reconnected) to the external AC power source 228. The second processor 224 of the printing device 204 then outputs the directional force measurements and the measure of time to the first processor 224 of the computerized device 200 based on the second processor 224 of the printing device 204 detecting the power supply device being connected (or reconnected) to the external AC power source 228.

The first processor 224 of the computerized device 200 calculates a path of movement of the printing apparatus 204 that occurred while the printing apparatus 204 was disconnected from the external AC power source 228 based on the directions, magnitudes, and time durations (of accelerations and decelerations) detected by the directional force measurements. Again, this path of movement has a beginning point and an ending point. The first processor 224 of the computerized device 200 calculates the path of movement based on patterns of directions, magnitudes, and time durations the directional force sensor 250.

The first processor 224 of the computerized device 200 calculates and outputs: a notification that the printing apparatus 204 has experienced movement that exceeds time, distance, or force magnitude limits; the calculated path; and potentially a revised geographic location (or estimate) of the printing apparatus 204 by locating the beginning point of the path of movement at the recorded geographic location and calculating the revised geographic location as the ending point of the path of movement.

In some methods, devices, and systems herein the printing apparatus 204 can be mounted on one or more wheels, one or more of which can comprise a rotational sensor 254 that outputs a distance measurement. If so equipped, the first processor 224 of the computerized device 200 can calculate the path of movement based in part on the distance measurement.

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

Many computerized devices are discussed above. Computerized devices that include chip-based central processing units (CPU's), input/output devices (including graphic user interfaces (GUI), memories, comparators, processors, etc.) are well-known and readily available devices produced by manufacturers such as Dell Computers, Round Rock Tex., USA and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the systems and methods described herein. Similarly, scanners and other similar peripheral equipment are available from support company Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes. Further, the terms automated or automatically mean that once a process is started (by a machine or a user), one or more machines perform the process without further input from any user.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. An apparatus comprising:
   a processor;
   a non-transitory computer-readable storage medium operatively connected to said processor;
   a clock device operatively connected to said processor, said clock device outputting a measure of time;
   a directional force sensor operatively connected to said processor, said directional force sensor outputting directional force measurements having direction and magnitude;
   a direct current (DC) power storage element operatively connected to said processor and said directional force sensor; and
   a power supply device operatively connected to an external alternating current (AC) power source, said processor, and said DC power storage element, said apparatus one of comprising and being connected to a primarily stationary apparatus capable of performing a primary operating function only while connected to said AC power source, said processor detecting said power supply device being disconnected from said external AC power source, said processor controlling said DC power storage element to supply power only to items relating to detecting and tracking a motion of said primarily stationary apparatus by supplying power only to said processor, said non-transitory computer-readable storage medium, said clock device, and said directional force sensor based on said processor detecting said power supply being disconnected from said external AC power source, said processor recording said directional force measurements and said measure of time while said processor detects said power supply is disconnected from said external AC power source to store directions, magnitudes, and time durations of said directional force measurements in said non-transitory computer-readable storage medium, and said processor calculating and outputting a path of movement of said apparatus occurring while said apparatus was disconnected from said external AC power source based on said directions, magnitudes, and time durations of said directional force measurements.

2. The apparatus according to claim 1, said processor activating said directional force sensor only while said processor detects said power supply is disconnected from said external AC power source.

3. The apparatus according to claim 1, said processor calculating said path of movement based on patterns of directions, magnitudes, and time durations of accelerations and decelerations detected by said directional force sensor.

4. The apparatus according to claim 1, said apparatus comprising a wheel, said wheel comprising a rotational sensor outputting a distance measurement, said processor calculating said path of movement based in part on said distance measurement.

5. The apparatus according to claim 1, said directional force sensor comprising a plurality of accelerometers.

6. A printing apparatus comprising:
a processor;
a non-transitory computer-readable storage medium operatively connected to said processor, said non-transitory computer-readable storage medium storing a recorded geographic location of said printing apparatus;
a clock device operatively connected to said processor, said clock device outputting a measure of time;
a printing engine operatively connected to said processor;
a directional force sensor operatively connected to said processor, said directional force sensor outputting directional force measurements having direction and magnitude;
a direct current (DC) power storage element operatively connected to said processor and said directional force sensor; and
a power supply device operatively connected to an external alternating current (AC) power source, said processor, said printing engine, and said DC power storage element,
said processor detecting said power supply device being disconnected from said external AC power source,
said processor controlling said DC power storage element to supply power only to items relating to detecting and tracking a motion of said printing apparatus by supplying power only to said processor, said non-transitory computer-readable storage medium, said clock device, and said directional force sensor based on said processor detecting said power supply being disconnected from said external AC power source, said processor recording said directional force measurements and said measure of time while said processor detects said power supply is disconnected from said external AC power source to store directions, magnitudes, and time durations of said directional force measurements in said non-transitory computer-readable storage medium, said processor calculating a path of movement of said printing apparatus occurring while said printing apparatus was disconnected from said external AC power source based on said directions, magnitudes, and time durations of said directional force measurements, said path of movement having a beginning point and an ending point, and said processor calculating and outputting a revised geographic location of said printing apparatus by locating said beginning point of said path of movement at said recorded geographic location and calculating said revised geographic location as said ending point of said path of movement.

7. The printing apparatus according to claim 6, said processor activating said directional force sensor only while said processor detects said power supply is disconnected from said external AC power source.

8. The printing apparatus according to claim 6, said processor calculating said path of movement based on patterns of directions, magnitudes, and time durations of accelerations and decelerations detected by said directional force sensor.

9. The printing apparatus according to claim 6, said printing apparatus comprising a wheel, said wheel comprising a rotational sensor outputting a distance measurement, said processor calculating said path of movement based in part on said distance measurement.

10. The printing apparatus according to claim 6, said printing engine operating only when said power supply is connected to said external AC power source.

11. A system comprising:
a computerized device; and
a printing apparatus operatively connected to said computerized device,
said computerized device comprising a first processor and a first non-transitory computer-readable storage medium operatively connected to said first processor,
said first non-transitory computer-readable storage medium storing a recorded geographic location of said printing apparatus,
said printing apparatus comprising:
a second processor;
a second non-transitory computer-readable storage medium operatively connected to said second processor;
a clock device operatively connected to said second processor, said clock device outputting a measure of time;
a printing engine operatively connected to said second processor;
a directional force sensor operatively connected to said second processor, said directional force sensor outputting directional force measurements having direction and magnitude;
a direct current (DC) power storage element operatively connected to said second processor and said directional force sensor; and a power supply device operatively connected to an external alternating current (AC) power source, said second processor, said printing engine, and said DC power storage element, said second processor detecting said power supply device being disconnected from said external AC power source, said second processor controlling said DC power storage element to supply power only to items relating to detecting and tracking a motion of said printing apparatus by supplying power only to said processor, said non-transitory computer-readable storage medium, said clock device, and said directional force sensor based on said processor detecting said power supply being disconnected from said external AC power source, said second processor recording said directional force measurements and said measure of time while said processor detects said power supply is disconnected from said external AC power source to store directions, magnitudes, and time durations of said directional force measurements in said second non-transitory computer-readable storage medium, said second processor detecting said power supply device being connected to said external AC power source, said second processor outputting said directional force measurements and said measure of time to said first processor based on said second processor detecting said power supply device being connected to said external AC power source, said first processor calculating a path of movement of said printing apparatus occurring while said printing apparatus was disconnected from said external AC power source based on said directions, magnitudes, and time durations of said directional force measurements, said path of movement having a beginning point and an ending point, and said first processor calculating and outputting a revised geographic location of said printing apparatus by locating said beginning point of said path of movement at said recorded geographic location and calculating said revised geographic location as said ending point of said path of movement.

12. The system according to claim 11, said second processor activating said directional force sensor only while said processor detects said power supply is disconnected from said external AC power source.

13. The system according to claim 11, said first processor calculating said path of movement based on patterns of directions, magnitudes, and time durations of accelerations and decelerations detected by said directional force sensor.

14. The system according to claim 11, said printing apparatus comprising a wheel, said wheel comprising a rotational sensor outputting a distance measurement, said first processor calculating said path of movement based in part on said distance measurement.

15. The system according to claim 11, said printing engine operating only when said power supply is connected to said external AC power source.

16. A method comprising:
detecting a power supply device of an apparatus being disconnected from an external alternating current (AC) power source using a processor of said apparatus;

controlling a direct current (DC) power storage element of said apparatus, using said processor, to supply power only to items relating to detecting and tracking a motion of said apparatus by supplying power only to said processor, a non-transitory computer-readable storage medium of said apparatus, a clock device of said apparatus, and a directional force sensor of said apparatus based on said processor detecting said power supply being disconnected from said external AC power source;

recording directional force measurements output by said directional force sensor and a measure of time output by said clock device while said processor detects said power supply is disconnected from said external AC power source to store directions, magnitudes, and time durations of said directional force measurements in said non-transitory computer-readable storage medium; and calculating and outputting a path of movement occurring while said apparatus was disconnected from said external AC power source based on said directions, magnitudes, and time durations of said directional force measurements using said processor.

17. The method according to claim 16, said processor activating said directional force sensor only while said processor detects said power supply is disconnected from said external AC power source.

18. The method according to claim 16, said processor calculating said path of movement based on patterns of directions, magnitudes, and time durations of accelerations and decelerations detected by said directional force sensor.

19. The method according to claim 16, said apparatus comprising a wheel, said wheel comprising a rotational sensor outputting a distance measurement, said processor calculating said path of movement based in part on said distance measurement.

20. The method according to claim 16, said directional force sensor comprising a plurality of accelerometers.

* * * * *